United States Patent [19]

Moore et al.

[11] 4,386,792
[45] Jun. 7, 1983

[54] FABRICATED LOAD SUPPORT STRUCTURAL MEMBER

[75] Inventors: Thomas S. Moore, Northville; Terrence Smith, Dearborn, both of Mich.

[73] Assignee: Ford Motor Company, Dearborn, Mich.

[21] Appl. No.: 948,598

[22] Filed: Oct. 4, 1978

[51] Int. Cl.³ .............................................. B62D 21/00
[52] U.S. Cl. ..................................... 280/781; 280/785
[58] Field of Search ................ 280/781, 785, 790, 800

[56] References Cited

U.S. PATENT DOCUMENTS

| | | | |
|---|---|---|---|
| 1,604,151 | 10/1926 | Dornier | 52/732 |
| 2,001,846 | 5/1935 | Ledwinka | 280/796 |
| 2,009,963 | 7/1935 | Matthaei | 280/796 |
| 2,611,627 | 9/1952 | Reynolds | 280/785 |
| 2,901,266 | 8/1959 | Lindsay | 429/226 |
| 3,940,162 | 2/1976 | Winslow | 280/186 R |
| 4,147,379 | 4/1979 | Winslow | 280/781 |

FOREIGN PATENT DOCUMENTS

| | | |
|---|---|---|
| 929052 | 6/1955 | Fed. Rep. of Germany . |
| 414118 | 12/1966 | Switzerland . |
| 1314422 | 4/1973 | United Kingdom . |

*Primary Examiner*—Joseph F. Peters, Jr.
*Assistant Examiner*—John A. Carroll
*Attorney, Agent, or Firm*—Peter D. McDermott; Roger L. May

[57] ABSTRACT

A motor vehicle frame has two longitudinal side members and a plurality of cross members. The front portion of the side member has an integrally stamped portion which includes an integrally formed spring tower and an aperture adapted to receive a brake fluid hose leading to a wheel assembly. A mid-section of the side members includes a fabrication of upper and lower plate members with an interconnecting web section therebetween. A rear portion of the frame includes the side member formed from two C-channel portions with an aperture therethrough and a cross member passing through the apertures with a bracket integrally formed at each end of the cross member for connection with a wheel assembly of the vehicle.

14 Claims, 8 Drawing Figures

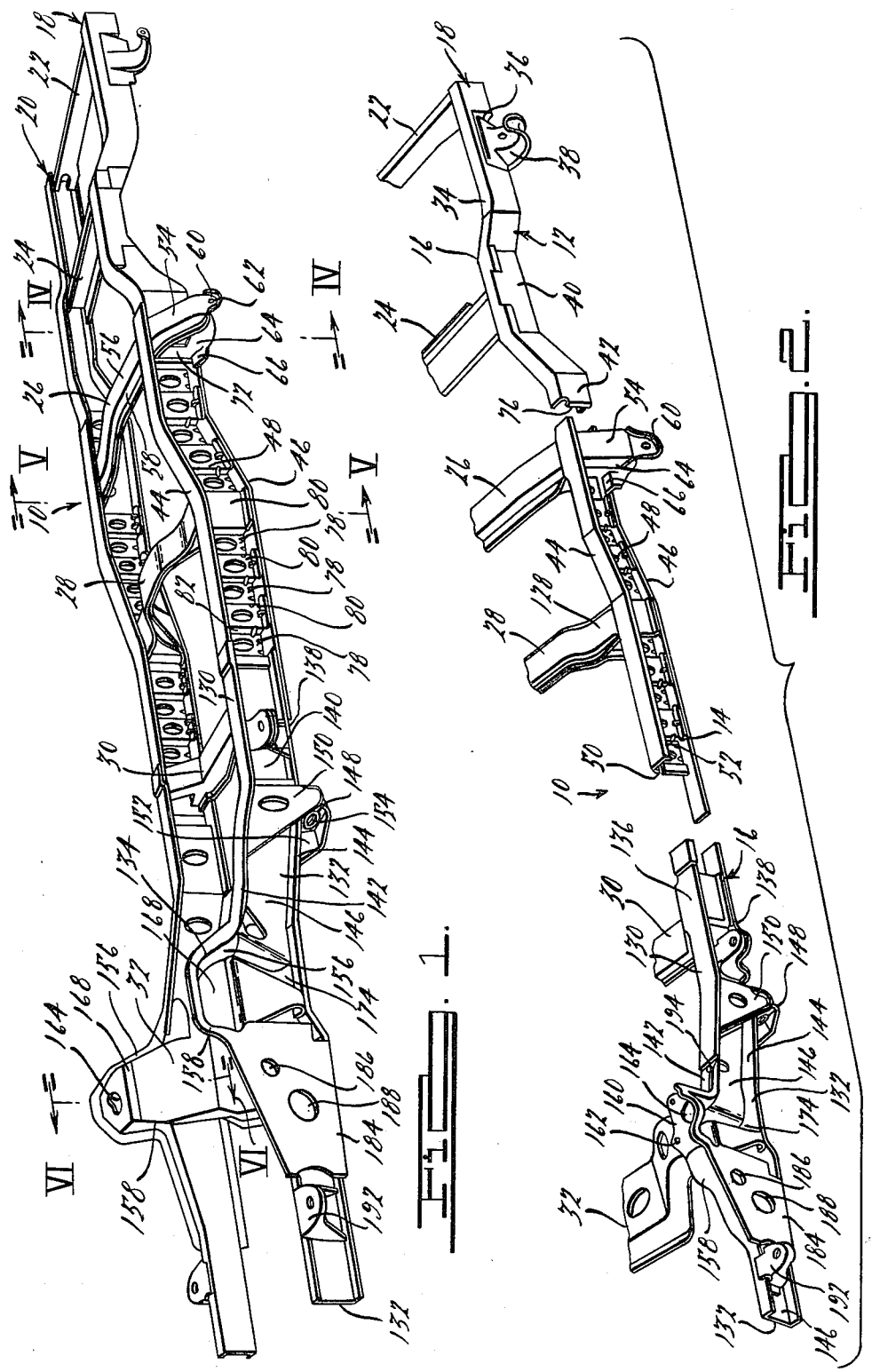

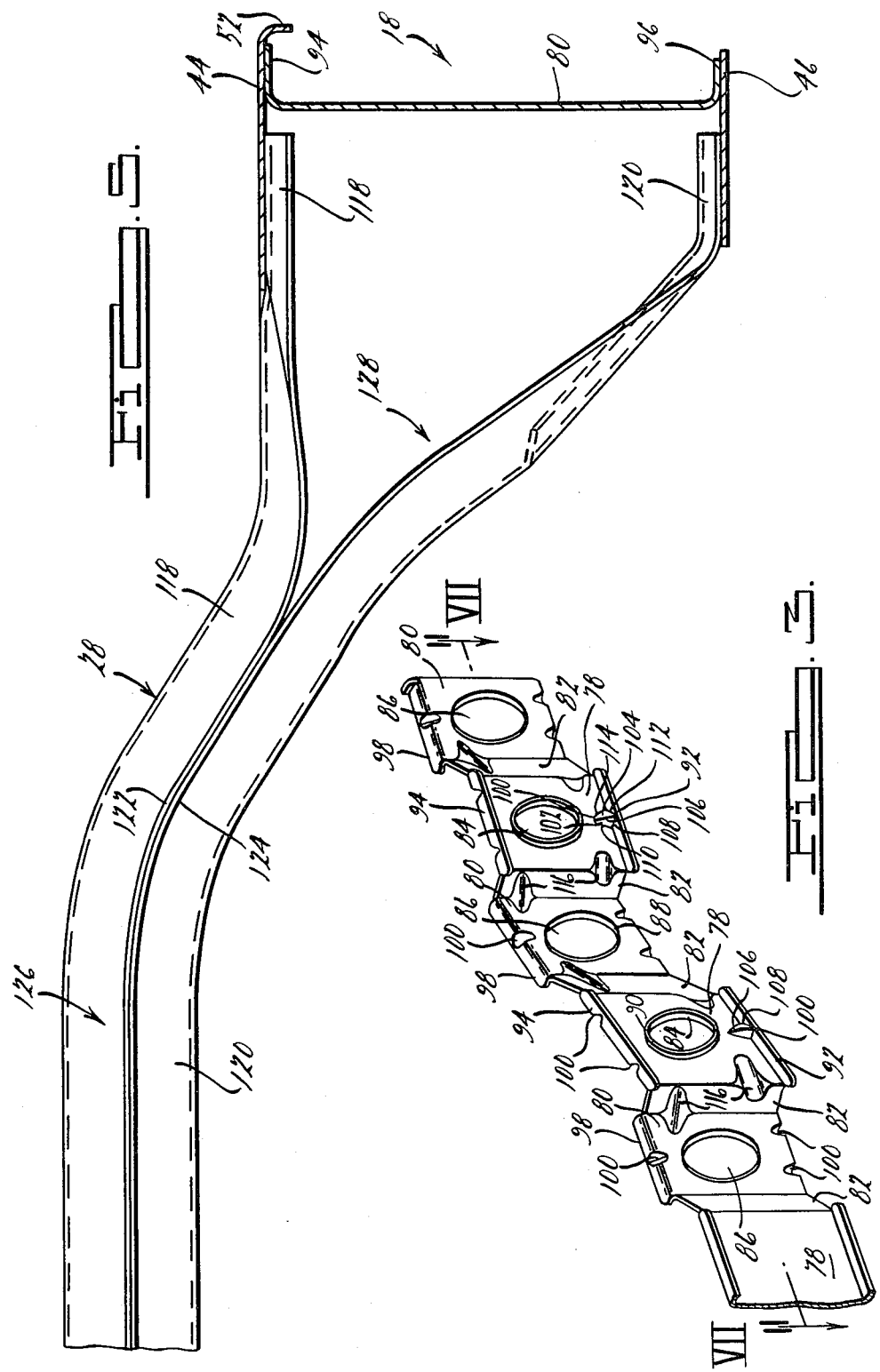

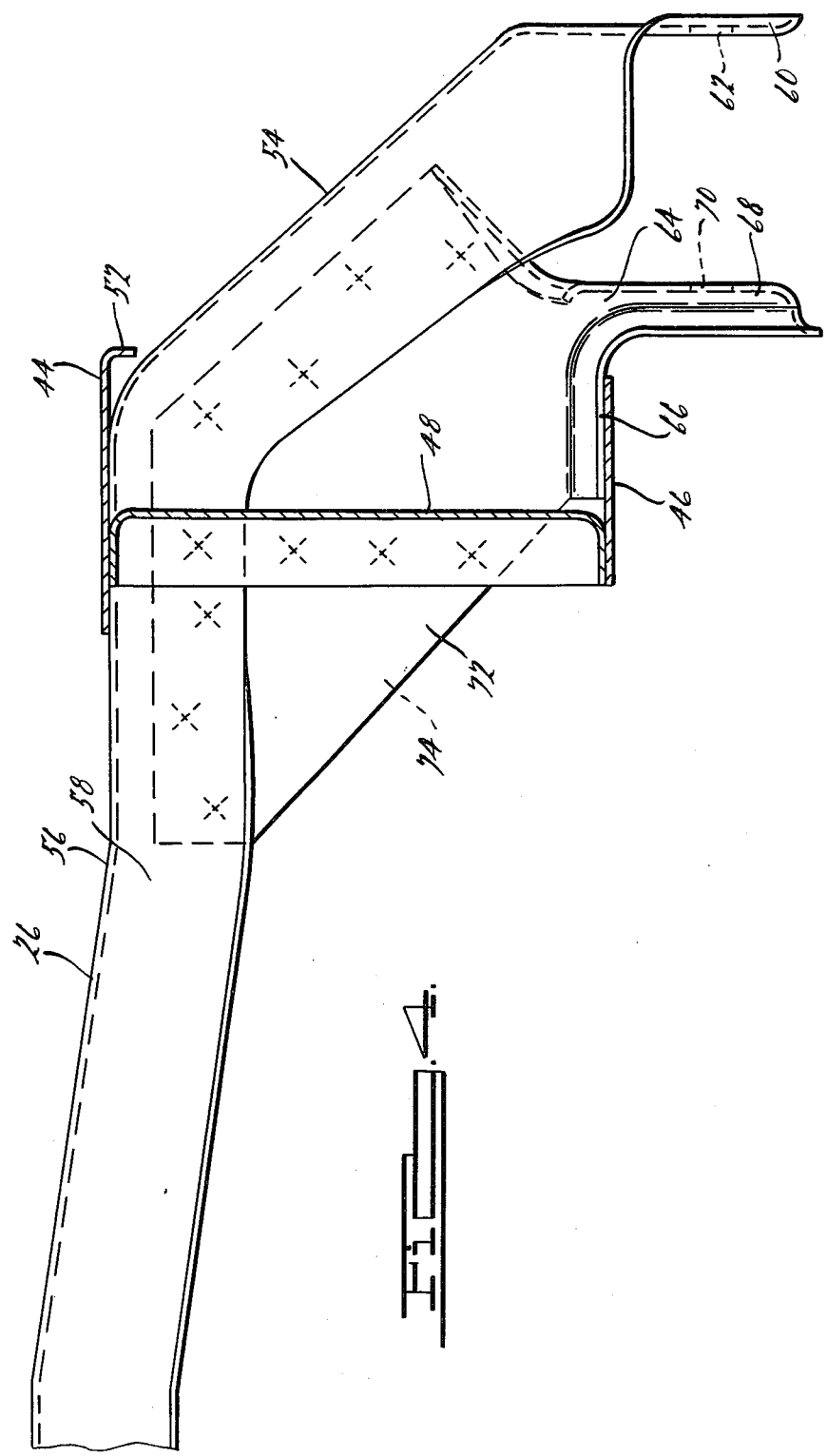

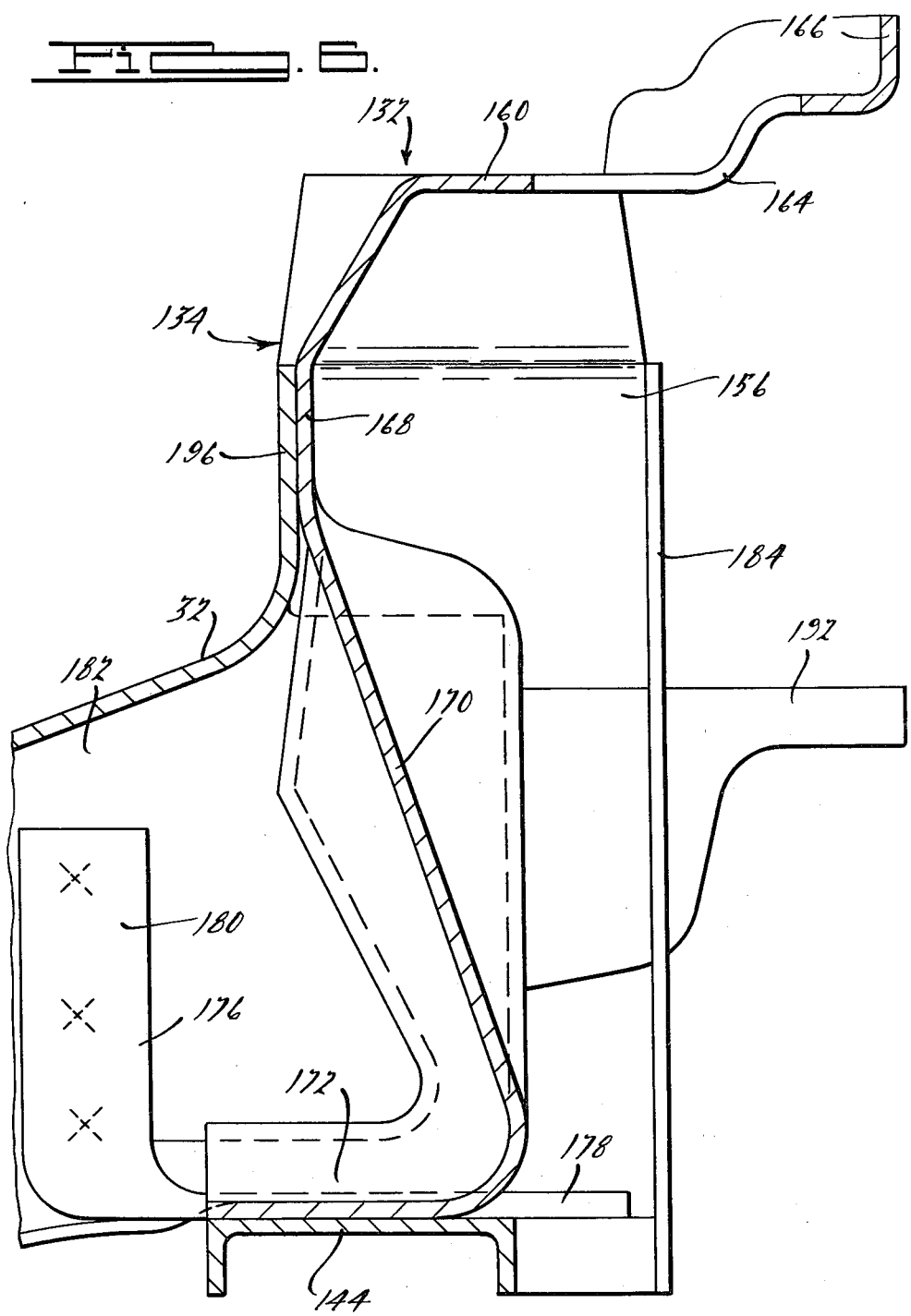

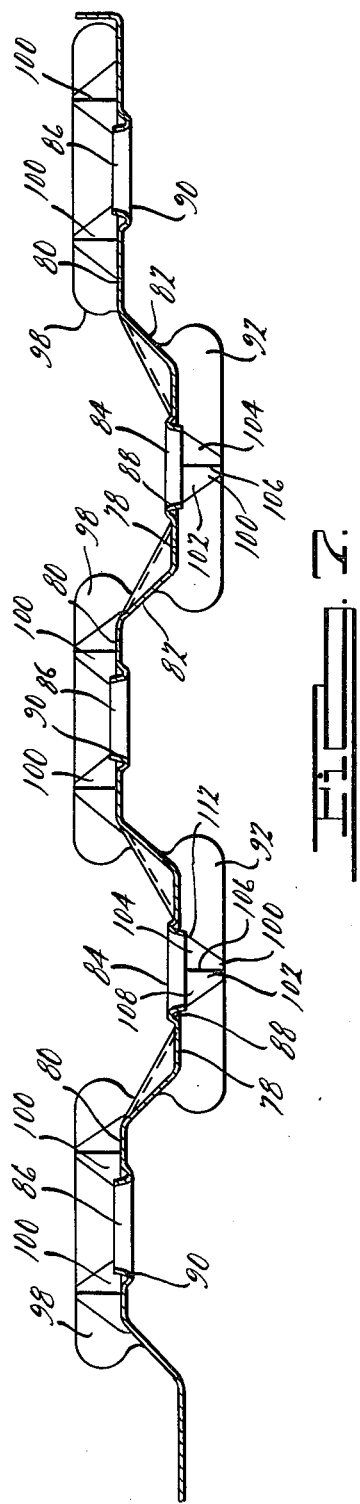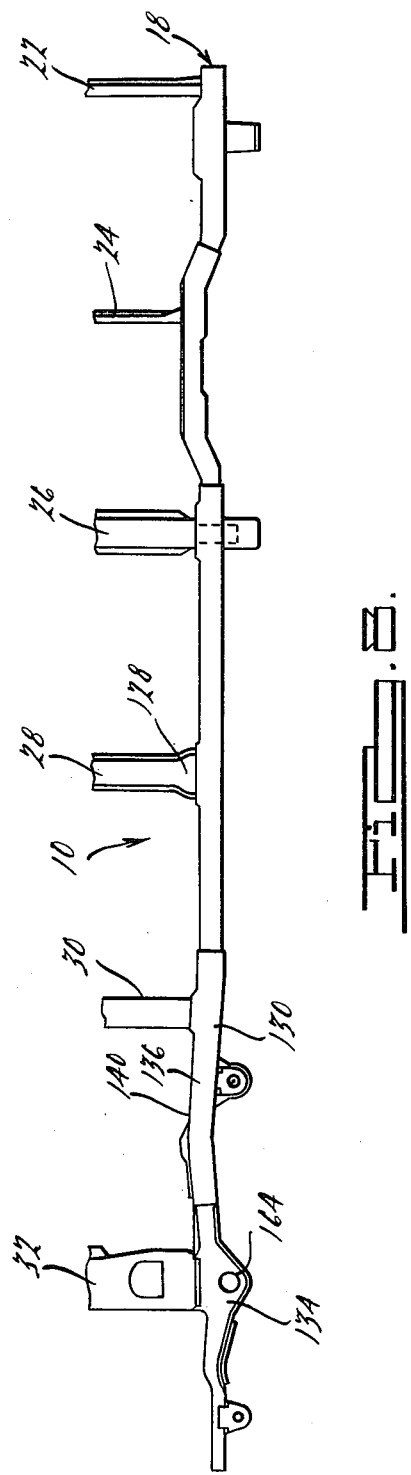

FABRICATED LOAD SUPPORT STRUCTURAL MEMBER

BACKGROUND OF THE INVENTION

1. Field of the Invention

This invention relates to load support structural members, particularly suitable for use with motor vehicles.

2. Description of the Prior Art

Load support structural members, particularly for use with motor vehicles, conventionally have left and right one-piece C-channel side support members with cross members connecting the two side members together. Brackets are welded onto each C-channel side member for connection with wheel suspension assemblies and a vehicle body. The conventional frame member comprises a significant proportion of the total weight of the vehicle. The conventional frame has excessive weight due to the thickness of the C-channel side members and the massive brackets welded thereon for attachment to the wheel assemblies. The excess weight of the frame cuts down on fuel efficiency of the motor vehicle. In addition, the energy needed in the refining and manufacture of the excess metal can be conserved if the excess metal is removed from the frame.

Federal regulations controlling fuel economy of motor vehicles, including trucks, have highlighted the need to make high strength frames with a minimum amount of weight. Attempts have been made to make a fabricated frame which deviates from the conventional frame having C-channel side members and cross members. One such frame is disclosed in U.S. Pat. No. 3,940,162 issued to Winslow et al on Feb. 24, 1976. The Winslow et al reference discloses side members having a top and bottom plate, each plate spaced apart with a reinforcing web zigzagging back and forth between the two plates. The web has a surface area which forms varying oblique and acute angles with the respective top and bottom plate members. Cross members are welded to the side members.

Frames often undergo high stresses at particular points. It is known that one high stress area is where the frame is connected to the wheel assemblies. Commonly, the wheel assembly is connected to the frame through a leaf spring suspension system at one or two mountings on the frame. These mounting areas are subject to the very high stresses of the driving force exerted by the drive wheels in either forward or reverse gear. Due to the lighter weight of the frames, the stress exerted on the frame must be more evenly distributed. A frame to alleviate this excessive stress at these points is desirable.

SUMMARY OF THE INVENTION

According to the invention, a load supporting structural member comprises a top plate member and bottom plate member spaced apart from each other. An interconnecting web portion has a bottom edge connected to the bottom plate member and a top edge connected to the top plate member. The web has a first and second set of vertical panels being substantially parallel and spaced apart from each other. In one embodiment, the first and second panels are equally spaced apart from a central longitudinal axis of the top and bottom flanges. A third set of panels includes panels not parallel with the panels of the first and second set and interconnects the edges of the first and second set of panels. In one embodiment, the panels of the third set intersects the central axis of the side member.

Means distribute excess stress from the edges of the panels throughout the rest of the web and top and bottom plate members. The distributing means in one embodiment includes flaps extending from the upper and lower edges of the first and second set of panels and abutting the top and bottom plate members. Each flap is substantially transverse to the panels. The flap and panel of either the first or second set share a common edge. Each flap and attached panel have a common crimp extending outwardly from the panel. In one embodiment, the crimp extends outwardly from the longitudinal axis of the side member. Each crimp has two surfaces. Each surface has an inner edge in common with the panel, a second edge in common with the flap, and a third edge in common with the other surface. The crimp has an axis lying in a plane substantially transverse to both the flaps and panel.

In one embodiment, each panel of the first and second set shares a common edge with the interconnecting panels, with each attached interconnecting panel and first or second set panel having a common second crimp. The second crimp has an edge in common with the panel and a second edge in common with the interconnecting panel. The second crimp forms, in part, the distributing means and distributes stress from the edges of the panels.

In one embodiment, the panels of the first and second sets have apertures in their central area for weight reduction thereof.

Further according to the invention, a fabricated motor vehicle frame comprises at least two side members extending longitudinally along the length of the frame and a plurality of cross members connecting the side members together.

In one embodiment, each side member has a fabricated portion thereof, including an upper substantially horizontal plate member, and a bottom substantially horizontal plate member, with an interconnecting web section having substantially vertical surfaces with a bottom edge secured to the bottom plate and an upper edge secured to the upper plate. The interconnecting web, in one embodiment, has a plurality of panels positioned non-parallel to the longitudinal axis of the side member so the web fluctuates about a longitudinal line parallel to the axis of the side member. Preferably, the web section has a thickness that is less than the thickness of the top of bottom plate members.

In one embodiment, at least one cross member extends through an aperture of the side members and has an integrally formed bracket portion for connection with the drive wheel assembly of a motor vehicle.

In a specific embodiment, the cross member extending through the side member has an upper surface and two downwardly extending flanges at edges of said upper surface. The aperture receiving the cross member is located in the interconnecting portion of the side member. The upper surface of the cross member is welded to the upper plate of the side member. A bracket having two vertical surfaces is nested between the two downwardly extending flanges and welded thereto. The vertical surfaces have a lower edge abutting the lower plate of the side member. The bracket and bracket portion of the cross member have means spaced apart for receiving a spring member therebetween and connecting the spring member thereto.

In one preferred embodiment, each side member has a stamped front section which includes a C-shaped channel member having a top flange, a bottom flange, and a vertical interconnecting portion connecting the top and bottom flanges at the inner edges thereof. The top flange has two upwardly extending, spaced apart portions forming a taller section of the side member. The taller section is securable to a suspension spring member connected to the wheel assembly of the motor vehicle.

Desirably, the stamped section has an aperture through one of the flanges adapted to receive and secure a brake fluid hose leading to the wheel assembly.

In one embodiment, the fabricated portion of the side member is welded at one end to the stamped front C-channel side portion, and at another end to a rear C-channel member.

BRIEF DESCRIPTION OF THE DRAWINGS

Reference will now be made to the following drawings, in which:

FIG. 1 is a perspective view of an embodiment of the invention.

FIG. 2 is a perspective fragmentary and exploded view of the embodiment in FIG. 1.

FIG. 3 is an enlarged fragmentary view of the web portion of the side member shown in FIG. 2.

FIG. 4 is an enlarged cross sectional view taken on the line IV—IV in FIG. 1.

FIG. 5 is an enlarged cross sectional view taken along the lines V—V in FIG. 1.

FIG. 6 is an enlarged cross sectional view taken along the lines VI—VI in FIG. 1.

FIG. 7 is a cross sectional plan view taken along the lines VII—VII in FIG. 3.

FIG. 8 is a fragmentary plan view of the embodiment shown in FIG. 1.

DETAILED DESCRIPTION OF THE PREFERRED EMBODIMENT

Referring to FIGS. 1, 2, and 8, a modular frame 10 has side rails 18 and 20 with cross members 22, 24, 26, 28, 30 and 32 connecting the two side rails together. The side rails 18 and 20, and their connections with the respective cross members, are identical, except for being mirror images of each other. As such, reference will only be made to side rail 18 and its connections with the cross members unless otherwise indicated.

The frame 10 is segmented into a rear, middle and front section 12, 14 and 16, respectively. The rear section has the side rail 18 comprising a C-channel member 34. Cross member 22 extends transversely from the rear of the C-channel member 34. C-channel member 34 has an indentation 36 which has welded therein a bracket member 38 which is adapted to mount the rear portion of a leaf spring which is connected to a rear wheel assembly (not shown). The C-channel member 34 has a recessed and elevated portion 40 which is adapted to accommodate the rear wheel assembly and axle (not shown). Extending from the recessed portion 40 is a cross member 24 which is welded at its end to C-channel member 34. The front end 42 of the rear assembly is welded to the middle section 14.

The middle section 14 has its portion of side rail 18 comprising an upper plate member 44, a lower plate member 46, and an interconnecting web portion 48. The upper plate 44 is welded to the top flange of the C-channel 34 and lower plate 46 is welded to the lower flange of C-channel member 34.

The upper plate member 44 has downwardly extending flanges 50 and 52 at its inner and outer edges, respectively. Inner flange 50 is discontinuous at the point where cross members 26 and 28 extend under the plate 44 and through the side rail 18.

As more clearly shown in FIG. 4, the cross member 26 has a downwardly extending bracket section 54 at its outer end. The cross member has a top plate member 56 and two downwardly extending flange sections 58 which continue along the downwardly extending bracket section. The bottom of the bracket section has a rounded flanged end 60 with an aperture 62 therethrough. The top surface of the top plate 56 is welded to the plate member 44. Nested within the cross member 26 is a bracket 64 which has a flat surface 66 welded to the bottom plate 46 of the side channel 18. The bracket 64 also has a downwardly extending flanged end 68 with an aperture 70 aligned with aperture 62 and spaced thereapart to accommodate the front end of the leaf spring of the rear wheel assembly (not shown). The bracket 64 also has two side panels 72 and 74 which abut the inside of flanges 58 of the bracket and are welded thereto. A front flap 76 of the rear section 12 of the frame is welded to the rear flange 58 of the cross member 26.

Extending substantially longitudinally with the midsection of the side rail 18 is an interconnecting web 48. As shown in FIGS. 3 and 7, the web has a set of outer panels 78 and a set of inner panels 80. Each set of panels is intervally spaced such that each panel 78 opposes a gap between two adjacent panels 80 and vice versa. Each set of panels 78 and 80 are substantially parallel to each other and are positioned such that the longitudinal axis of the side rail passes therebetween. A set of interconnecting panels 82 joins the first two sets of panels 78 and 80 along their side edges. The interconnecting panels 82 form oblique angles with the connected panels 78 and 80, respectively. Each panel 82 intersects the longitudinal axis of the middle section 14 of the side rail.

Each panel 78 and 80 has a lightening hole 84 and 86 therethrough, respectively. The lightening holes 84 and 86 are elliptical in shape with the longer axis in a substantially vertical direction. Each lightening hole 84 and 86 has a double flange rim 88 and 90, respectively to accommodate ease in manufacturing.

Each aperture 84 is slightly offset in an upward direction from the central outer panel 78. Each hole 86 is slightly displaced in a downward direction from the center of panel 80. Each panel 78 has an outwardly extending flap 92 at its bottom edge and an outwardly extending flap 94 at its top edge. Each inner panel 80 has an inwardly extending flap 96 at its bottom edge and an inwardly extending flap 98 at its top edge. Each flap 92, 94, 96 and 98 abuts the adjacent plate member 44 or 46 and is welded thereto.

At each inner and outer panel 78 and 80, respectively, are crimps 100, commonly called in the industry "darts." Each dart 100, extending from panel 78 and 80, is substantially the same and, therefore, only reference to darts extending from the bottom portion of panel 78 will be described. The dart 100 is an outwardly folded portion of the panel 78 extending away from the axis of the side rail. The folded area has two surfaces 102 and 104. Each surface extends upwardly from flap 92 and outwardly from panel 78. The surfaces 102 and 104 are inclined toward each other and intersect to form an edge 106. Edge 106 has one end extending from panel 78, and its other end extending from flap 92. Surface 102 has a common edge 108 with flap 92, and a common edge 110 with panel 78. The edges 108 and 110 intersect with each other, as well as with edge 106, so that surface 102 is substantially triangular in shape. Surface 104 similarly has two common edges 112 and 114 with flaps 92 and panel 78, respectively, so that it is also substantially triangular in shape.

The crimp 100 at the bottom of web 78 is displaced along the vertical axis of the panel 78 directly below the elliptical lightening hole 84. There are two crimps 100 at the top edge of the panel 78, each crimp offset from the vertical axis to allow the top edge of lightening hole 84 to fit therebetween. Crimp 100 on panels 80 are opposite, in respect that there are two crimps at the bottom edge of panel 80 offset from the center axis to allow the bottom of lightening hole 86 to fit therebetween and only one crimp 100 at the top edge of the panel 78.

The web portion 48 also has a plurality of indentations 116 at the common edge between the panels 78 and 80 and the interconnecting panels 82. The indentations 116, extending between the interconnecting panels 82 and outside panels 78, are offset in the vertical direction toward the bottom of the panel 78. The indentations between interconnecting panels 82 and the inner panels 80 are vertically offset in the upward direction. The indentations have a longitudinal axis substantially transverse with the vertical common edge between the panels 78 and 80 and the interconnecting panels 82.

The darts 100 supply an anti-torsional resistance along the side rails so that any moments exerted on the side rail can be resisted. In addition, the indentations 116 alleviate high stress points along the common edge between the side panels 78 and 80 and the interconnecting panels 82 when there is such a torsional flex on the web 48. The flaps 92, 94, 96 and 98 provide for a proper weld between the web and the plate members 44 and 46. Lightening holes 84 and 86 provide for a weight reduction without substantially affecting the torsional strength or stress distribution of the side member.

Cross member 28, referring back to FIGS. 1, 2 and 8, and also FIG. 5, comprises two hat-shaped beams 118 and 120 with outer flanges 122 and 124 respectively welded together to form a tubular midsection 126. The end 128 of cross member 28 has the beam members 118 and 120 split apart to form an open alligator-type mouth. The upper beam 118 is welded to the upper plate member 44, and the lower beam member 120 is welded to the plate member 46. The tubular construction of the mid-portion provides for a high torsional resistance between the two side rails 18 and 20. The opened end 128 provides for flexibility of the end to accommodate torsional deflections of the side rail 18 and 20 and alleviate stress at the weld connecting the beams 118 and 120 to the side rails.

The midsection 14 of side rail can be made of short component parts welded together during assembly. The shorter subcomponents accommodate shipping and prevention of damage to the mid-section during shipping. The front of the mid-section 14 is welded to a front section 16. The front section has a transition C-channel member 130 welded along its front portion to integrally stamped C-channel member 112 which has an integral spring tower unit 134 therein.

The transition C-channel has an upper plate 136 and lower plate 138 extending axially outwardly from a vertical side section 140. In addition, integral stamped C-channel member 132 similarly has its upper plate 142 and lower plate 144 extending axially outwardly from its vertical side support 146. Cross member 30 which supports the transmission (not shown) extends through the side section 140 and is welded to the upper and lower plates 136 and 138.

At the forward end of the transition C-channel member 130 is an integral bracket 148 which has a side strut member 150 extending down from the outer edge of the top plate member 136 to a point below the lower plate member 138 and 144. The bracket 148 has upwardly extending flange 152 which abuts the side section 140 of the transition C-channel 130 and is welded thereto. The bracket has an aperture 154 therethrough adapted to receive a strut of the front wheel suspension (not shown).

The integral spring tower 134 referring to FIGS. 1, 2 and 6 of stamped member 132 comprises the upper plate member 142 having two upwardly sloped portions 156 and 158 and a top spanning portion 160. The spanning portion 160 has an indentation 162 therein which receives the coil spring member (not shown) and an aperture 164 therethrough which receives a shock absorber or other similar suspension member (not shown). The coil members in the suspension are connected to the front wheel assembly.

In addition, the spanning portion 160 has an upwardly extending rim 166 at an axially outer portion thereof and a downwardly extending vertical surface 168 to the inside of the spring tower spanning portion 160. The vertical surface 168 then has a downwardly extending tongue 170 which extends almost to the lower plate 144 and has a curled lower end 172. The curled lower end 172 extends to the lower plate member 144. The side member 146 is discontinuous so that a space 174 exists between the tongue 170 and the side members 146.

Fitted within the groove 174, between the tongue 170 and the side members 146, is an L-shaped angle plate 176. The L-shaped angle plate has a lower section 178 which is welded to the bottom plate member 144 and a vertical extending plate 180 which is welded to a side flange 182 extending from the side portion 146. The angle plate 176 gives added torsional support to the stamped section 132.

In addition, for added torsional strength, a plate 184 is welded to the upper rim 166 and lower plate member 144. The plate 184 has two apertures 186 and 188 therethrough to allow for passage of steering shaft (not shown) and also for tool axis. The side plate 146 also has an aperture 190 along with one of the apertures 186 or 188. To the front of the plate 184 is a bracket member 192 which is nested within the C-channel 132 and welded thereon. The bracket member 192 is for mounting the front radiator (not shown) to the frame.

Just to the rear of the spring tower 134, is an aperture 194 through the upper plate member 142. The aperture 194 is adapted to receive a brake fluid hose (not shown) which leads to the brakes on the front wheel assembly.

Front cross member 32 is welded to the vertical surface 168 of the spring tower. The front cross member 32 supports and mounts the engine of the motor vehicle to the frame. The cross member 34 has an abutting surface 196 which abuts the vertical surface 168 for welding of these two surfaces together.

The advantages of this frame can be described in terms of its operation and handling of stresses, such as compressions, which occur during a normal operation of a motor vehicle.

Conventionally, trucks have Hotchkiss type leaf spring suspensions at their driving rear wheels. In a Hotchkiss suspension, the reaction force occuring when torque is transmitted to the rear wheels is transferred through the leaf springs to the spring support brackets 54 and 64. As such, the stresses which occur at the bracket portions 54 and 64 are extremely high, often exceeding 6,000 lbs. The continuity of the cross beam member 26 through the side channel, rather than having two brackets welded on the outside portion of the side channel, as is conventional, provides a sturdier construction which is more able to handle the stresses that occur at that particular point in the frame.

The mid-section fabrication of the side rail, consisting of the upper and lower plate members 44 and 46 and web section 48 is easily adapted to have its web section 48 to be discontinuous. The discontinuance accomodates cross members such as 26, which incur high stress, to pass through the web section 48 between the upper and lower plate members 44 and 46.

In addition, the nested brackets 64, 38, 131 and 192, and cross members 26, 28 and 30, not only act as mounts for various parts such as radiators, cabs and leaf springs, but also act as further support of the frame member itself by being wedged between the two upper and lower plate members and welded to the web or side channel member. The nested bracket and cross members, by providing support, can reduce the weight of the frame by elimination of any excess side channel member which would overlap the bracket or cross member. The side channel can be cut out and the bracket nested in place of the side channel section.

Another area where high stress occurs is where the strut member of a twin I-beam suspension is attached to the front portion of the frame. The integral bracket member 148 extends downwardly right from the side rail. This bracket member 148 will thus be capable of withstanding high stresses with a minimum of weight added to the frame. The high stresses occur because of shock absorption of the wheel which is transmitted through the twin I-beams to the cross member 32 and through the bracket 148.

The mid-section fabrication between the upper and lower panels forms a high strength beam member with a minimum amount of weight. As such, the fabricated web beam member incorporated in the frame of the motor vehicle frame reduces the weight in the vehicle and still provides adequate torsional strength and compression strength.

The integral stamped spring tower also uses the principle that the integral stamped portion is stronger per weight unit than conventional welded-on brackets on the C-channel member. High stresses are more easily transmitted through the integral spring tower to be absorbed by the spring member and the shock absorber. The integral member is inexpensively made by just stamping it out and folding it to its proper dimensions. This eliminates many welds through the spring tower section which would otherwise have to be made in the manufacture thereof.

The use of the aperture 194 through the outwardly extending upper plate 142 allows for the elimination of a large conventional bracket which is needed on the conventional C-channel frame member for mounting the brake fluid hose. The elimination of the large bracket reduces weight of the frame and also reduces any possibilities that the bracket may bend and disalign the brake fluid hose from its proper position.

In this fashion, a modular frame member is fabricated which keeps weight of the frame to a minimum while providing strength throughout the frame, particularly where the stresses are high, and allows for adaptation of the frame to various length trucks or other motor vehicles by the modular aspect of the frame wherein other additions can be added on at the mid-section. The frame is ideal for a line of pickup trucks. A line of pickup trucks normally comprise a choice of cab and box designs of different lengths.

Variations and modifications are possible within the scope of the foregoing disclosure and drawings without departing from the spirit of the invention which is defined by the appended claims.

We claim:
1. A load supporting structural member comprising:
a top substantially horizontal plate member;
a bottom substantially horizontal plate member;
an interconnecting web portion with a bottom edge connected to the bottom plate member and a top edge connected to the top plate member between the edges of the two respective plate members;
the web having panels contained in substantially vertical planes;
a first and second set of panels being substantially parallel and laterally spaced apart from each other;
a third set of panels connecting the first and second sets;
means for distributing excess stress from edges of the panels throughout the rest of the web and plate members, said means, at least in part, being interposed between the first and third set of panels and the second and third set of panels; and
means for supporting the plate members rigidly to the web section.

2. A load supporting structural member comprising:
a top substantially horizontal plate member;
a bottom substantially horizontal plate member;
an interconnecting web portion with a bottom edge connected to the bottom plate member and a top edge connected to the top plate member between the edges of the two respective plate members;
the web having panels contained in substantially vertical planes;
a first and second set of panels being substantially parallel and laterally spaced apart from each other;
a third set of panels connecting the first and second sets;
means for distributing excess stress from edges of the panels throughout the rest of the web and plate members;
means for supporting the plate members rigidly to the web section;
the supporting means includes:
upper and lower flaps extending from the upper and lower edges of the first and second set of panels substantially transverse to the panels; the upper flaps being welded to the top plate member and lower flaps being welded to the bottom plate member; the flaps and panels having a common edge; each flap and respective panel of the first and second set have a common crimp extending outward from the plane of said panels of the first and second set; each crimp having two surfaces; the two surfaces having an inner edge in common with the web panels of one of the first and second sets, a second edge in common with the flap and a common third edge; and the distributing means includes: each panel of the first and second set and interconnecting panels having a common second crimp; each second crimp having an edge in common with the panels of one of the first and second sets and a second edge in common with the interconnecting panel.

3. A load supporting member as defined in claim 1 or 2, further comprising weight reducing apertures in the central area of a plurality of panels of the first and second sets.

4. A motor vehicle frame comprising:

two longitudinally extending side members;

a plurality of cross members connecting the two side members;

each side member has a fabricated portion thereof including a top substantially horizontal plate member; a bottom substantially horizontal plate member, an interconnecting web section with substantially vertical surfaces, the web section having a bottom edge secured to said bottom plate member and an upper edge secured to said top plate member; the web having a portion of the surfaces positioned nonparallel to longitudinal axis of the side member so the web has portions alternating about a longitudinal line parallel to the longitudinal axis of the side member;

means for distributing excess stress from edges of the web throughout the rest of the web and plate members, said means positioned at said nonparallel surfaces between the bottom and upper edges of said web section; and the material forming said web section having a thickness that is less than the thickness of the top and bottom plate members.

5. A motor vehicle frame comprising:

two longitudinally extending side members;

a plurality of cross members connecting the two side members;

each side member has a fabricated portion thereof including a top substantially horizontal plate member, a bottom substantially horizontal plate member, and an interconnecting web section with substantially vertical surfaces;

the web section having a bottom edge secured to said bottom plate member and an upper edge secured to said top plate member;

the web having a portion of the surfaces positioned nonparallel to a longitudinal axis of the side member so the web has portions alternating about a longitudinal line parallel to the longitudinal axis of the side member;

the material forming said web section having a thickness that is less than the thickness of the top and bottom plate members; and each side member comprising a front, middle and rear portion; the front and rear portions each include C-shaped channels with a lower flange, upper flange and an integral vertical interconnecting portion connecting the upper and lower flanges at edges thereof; the middle portion comprises the fabricated portion of each side member and welded at each end to the front and rear portions of each respective side member with the top plate welded to the upper flange and bottom plate welded to the lower flange.

6. A motor vehicle frame as defined in claim 5 wherein the upper flange of the front C-shaped channel has two opposing and spaced apart upwardly extending portions forming a taller section of the longitudinal side member; the taller section having seat means integrally formed therewith for securing thereon a spring member being connectable to a wheel assembly of the motor vehicle.

7. A motor vehicle frame as defined in claim 6 further comprising:

at least one cross member extending through an aperture in each side member and having an integrally formed bracket section at the ends thereof for connection with a wheel assembly of a motor vehicle.

8. A motor vehicle frame as defined in claim 7 wherein:

said aperture extends through said web section, the crossmember extending through the aperture is welded to the top plate member.

9. A motor vehicle frame comprising;

side members extending along the length of the frame;

cross members connecting the side members;

at least one cross member extending through an aperture in each side member and having an integrally formed bracket section at the ends thereof for connection with a wheel assembly of a motor vehicle;

a bracket secured to both the cross member extending through the side member and one of said side members;

said bracket having a portion spaced apart from said bracket section of the cross member for receiving a spring member therebetween; and means for connecting the spring member to the bracket and bracket section of the cross member.

10. A motor vehicle frame comprising:

longitudinal extending side members;

cross members connecting the two side members;

each side member has a front stamped section including a C-shaped channel member with a top flange, bottom flange, and vertical interconnecting portion connecting the top and bottom flanges at the inner edges thereof; the top flange having two opposing and spaced apart upwardly extending portions forming a taller section of the longitudinal side member; the taller section having seat means integrally formed therewith for securing thereon a spring member being connectable to a wheel assembly to the motor vehicle.

11. A motor vehicle as defined in claim 10 wherein one of the flanges of each side member has an aperture therethrough adapted to receive and secure a brake fluid hose leading to the wheel assembly.

12. A motor vehicle frame comprising;

side members extending along the length of the frame;

cross members connecting the side members;

at least one cross member extending through an aperture in each side member and having an integrally formed bracket section at the ends thereof for connection with a wheel assembly of a motor vehicle;

the cross member having an upper portion and two downwardly extending flanges at the edge of the upper portion;

each side member having a lower horizontal plate member, upper horizontal plate member, and an interconnecting portion therebetween;

said aperture through the side member extending through the interconnecting portion;

the cross member extending through the aperture being welded to the upper plate member;

the bracket having two substantially vertical surfaces which abut the flanges of the cross member and are welded thereto; and the two vertical surfaces of the bracket each having a bottom edge which abuts said lower horizontal plate member.

13. A motor vehicle frame as defined in claim 7 wherein:

the interconnection portion comprises three sets of panels contained in substantially verticle planes;

said first and second set of panels being substantially parallel and laterally spaced apart from each other;

said third set of panels connecting the first and second sets;

means for distributing excess stress from edge of the panels throughout the rest of said portion and plate members; and means for supporting the plate members rigidly to the interconnecting portion.

14. A load supporting structural member comprising:

a top substantially horizontal plate member;

a bottom substantially horizontal plate member;

an interconnecting web portion with a bottom edge connected to the bottom plate member and a top edge connected to the top plate member between the edges of the two respective plate members;

the web having panels contained in substantially vertical planes;

a first and second set of panels being substantially parallel and laterally spaced apart from each other;

a third set of panels connecting the first and second sets;

means for distributing excess stress from edges of the panel throughout the rest of the web and plate member, said means, at least in part, being interposed between the first and third set of panels and the second and third set of panels;

means for supporting the plate members rigidly to the web section;

the supporting means includes upper and lower flaps extending from the upper and lower edges of the first and second set of panels substantially transverse to the panels;

the upper flaps being welded to the top plate member and the lower flaps being welded to the bottom plate member;

the flaps and panels having a common edge;

a common crimp being interposed between each upper flap and each panel of said first set of panels, two common crimps interposed between each lower flap and each panel of said first set of panels, two common crimps being interposed between each upper flap and each panel of said second set of panels one common crimp interposed between each lower flap and said each panel of said second set of panels;

each common crimp extending outward from the plane of said panels of the first and second sets;

each crimp having two surfaces, the two surfaces having an inner edge in common with the web panels of one of the first and second sets, a second edge in common with the flap, and a common third edge;

the distributing means includes each panel of the first set and said interconnecting panels having a common crimp located near the lower edge of the respective panels, each panel of the second set and said interconnecting panels having a common crimp located near the upper edge of said respective panels, each crimp of the first and second set and interconnecting panels having an edge in common with the panels of one of the first and second sets and a second edge in common with the interconnecting panel; and weight reducing apertures in the central area on a plurality of panels of the first and second sets.

* * * * *